United States Patent
Monti

(10) Patent No.: US 7,624,856 B2
(45) Date of Patent: Dec. 1, 2009

(54) METHOD FOR CONVEYING CONTAINERS THROUGH OPERATING STATIONS AND A MULTIPLE CONVEYOR FOR ACTUATING THE METHOD

(75) Inventor: Giuseppe Monti, Pianoro (IT)

(73) Assignee: Marchesini Group S.p.A., Pianoro (Bologna) (IT)

( * ) Notice: Subject to any disclaimer, the term of this patent is extended or adjusted under 35 U.S.C. 154(b) by 0 days.

(21) Appl. No.: 12/023,244

(22) Filed: Jan. 31, 2008

(65) Prior Publication Data
US 2008/0196997 A1    Aug. 21, 2008

(30) Foreign Application Priority Data
Feb. 15, 2007   (IT)   .................. BO2007A0085

(51) Int. Cl.
    *B65G 47/26*   (2006.01)
(52) U.S. Cl. .................................. 198/419.3
(58) Field of Classification Search ............... 198/419.3
    See application file for complete search history.

(56) References Cited

U.S. PATENT DOCUMENTS

| 4,045,945 A |   | 9/1977 | Moller et al. |
| 5,127,209 A | * | 7/1992 | Hunter ......................... 53/439 |
| 6,019,213 A | * | 2/2000 | Schubert .................. 198/419.3 |
| 6,260,689 B1 | * | 7/2001 | Takemoto et al. ......... 198/484.1 |
| 6,691,856 B1 | * | 2/2004 | Prakken .................... 198/419.3 |
| 6,929,111 B2 | * | 8/2005 | Rovers ........................ 198/429 |
| 7,497,319 B2 | * | 3/2009 | Boldrini et al. .......... 198/419.3 |

FOREIGN PATENT DOCUMENTS

JP          05278840 A     10/1993

OTHER PUBLICATIONS

International Search Report.

\* cited by examiner

*Primary Examiner*—Mark A Deuble
(74) *Attorney, Agent, or Firm*—William J. Sapone; Coleman Sudol Sapone P.C.

(57) ABSTRACT

The multiple conveyor is associated to an automatic machine for filling containers, and moves the containers through an inlet station, a filling station, a capping station and an outlet station. The multiple conveyor comprises: two transporters developing along a ring-wound trajectory which includes the stations; four batteries each formed by a predetermined number of gripping organs provided to receive and grip a same predetermined number of containers, the batteries being arranged along the trajectory and constrained, in pairs, to respective drive groups, in such a way that the batteries of one pair are intercalated with those of the other pair, and distanced, with respect to the other pair by dynamically variable amounts; control and command organs, suited to managing the transporters independently one from the other, based on dynamically variable parameters, in agreement with the motion required from time to time by the stations occupied by the respective batteries of gripping organs (3).

3 Claims, 4 Drawing Sheets

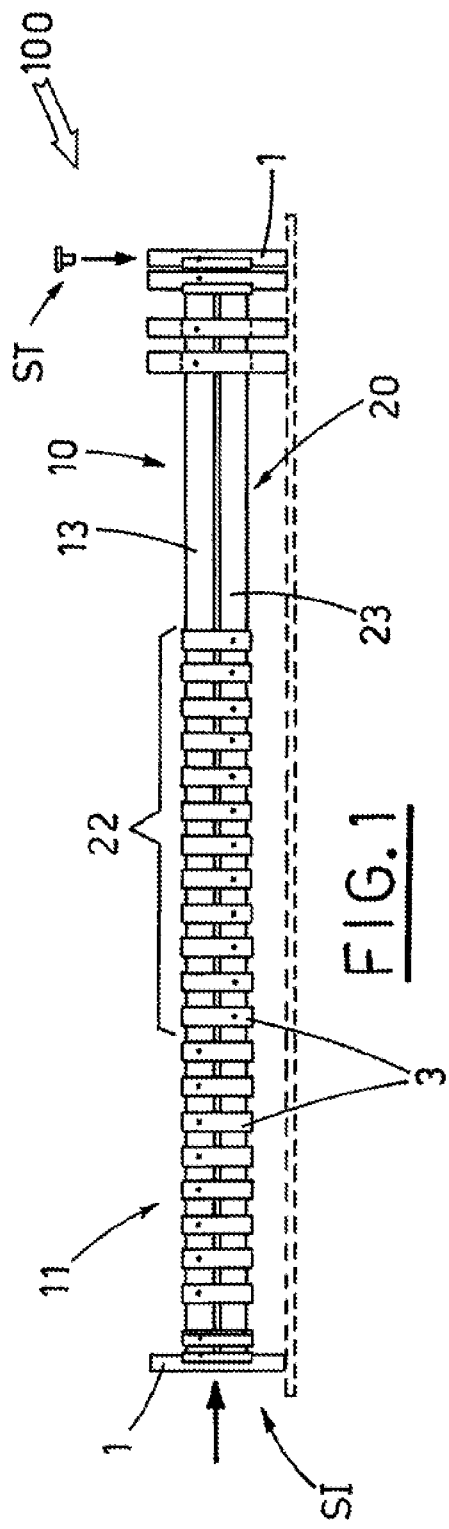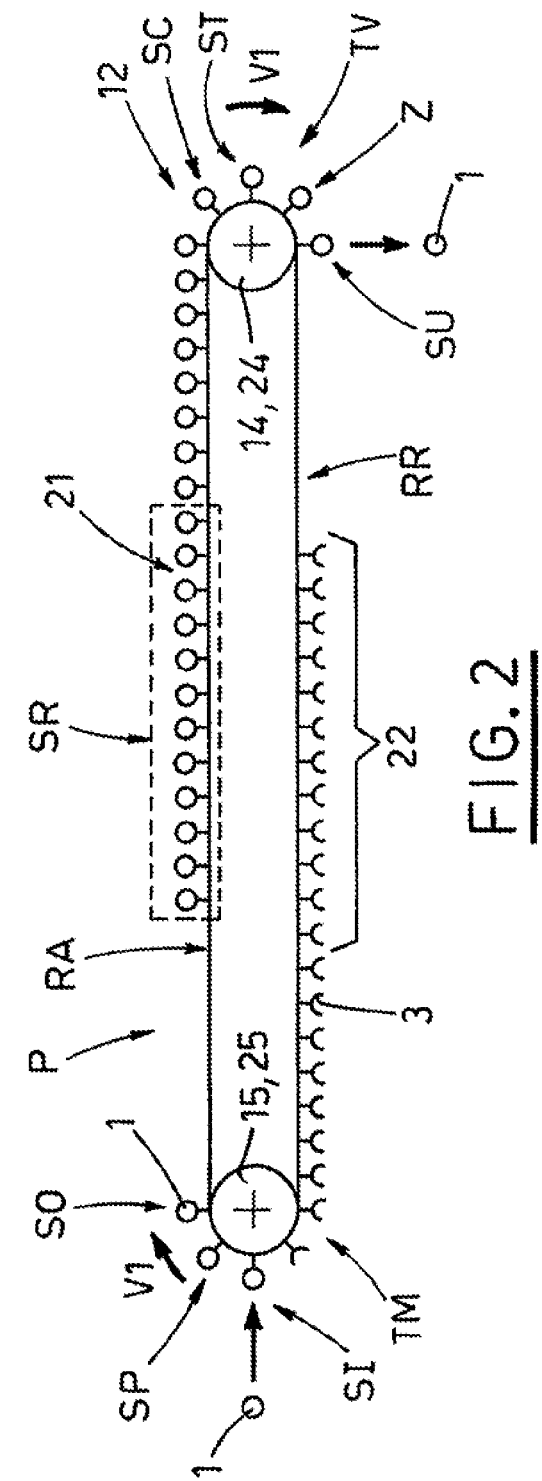

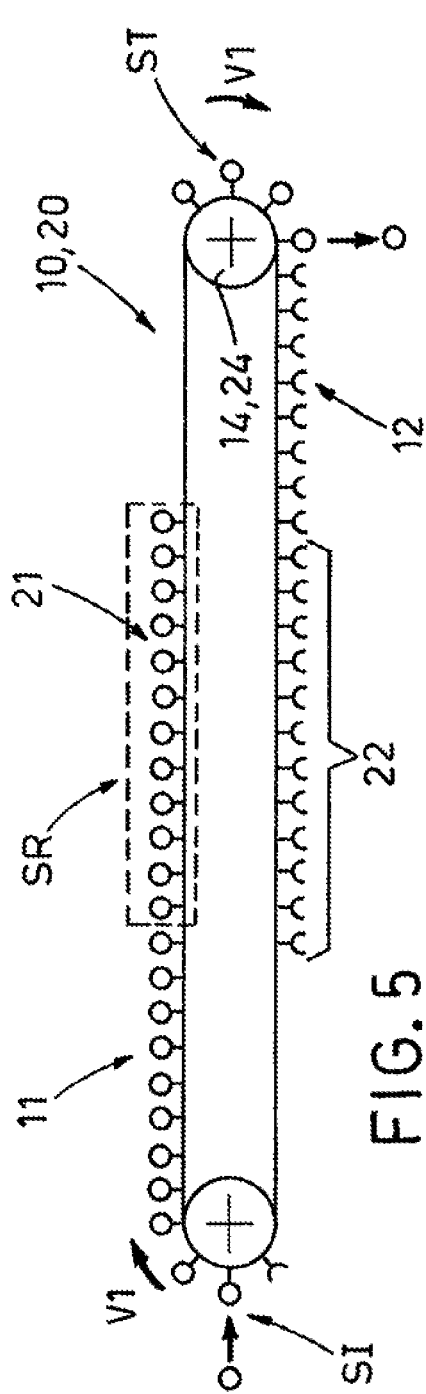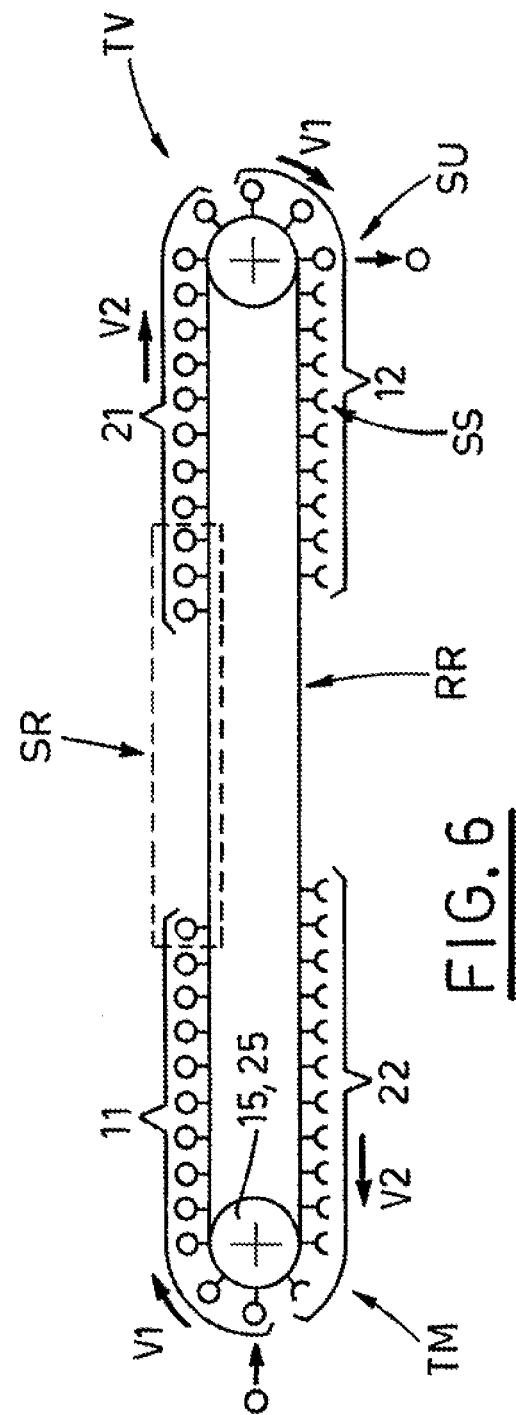
FIG. 5
FIG. 6

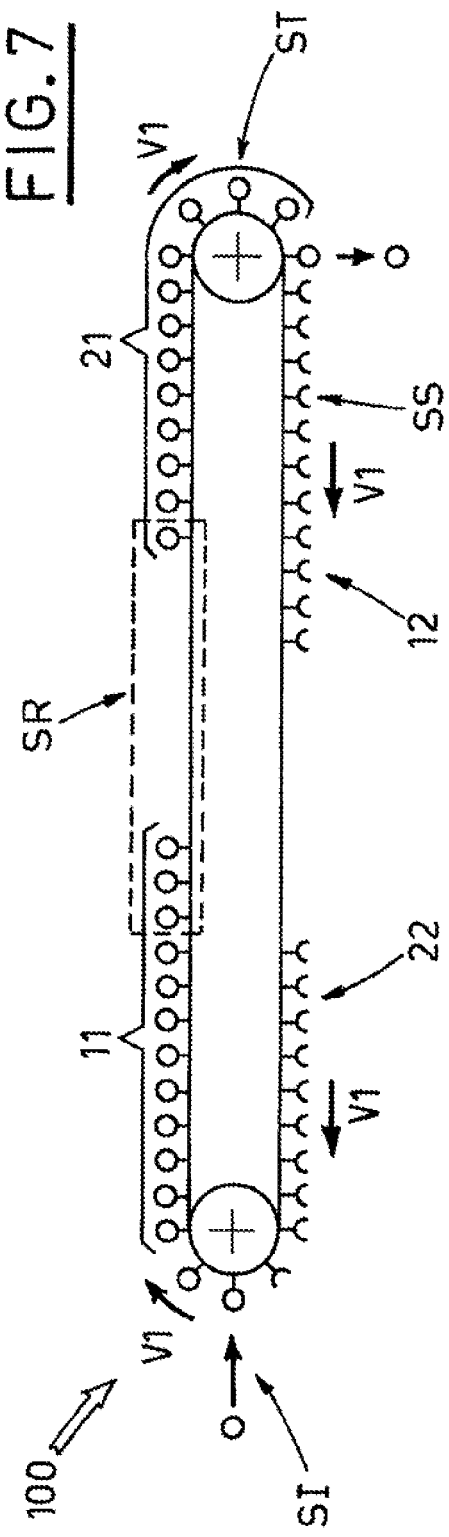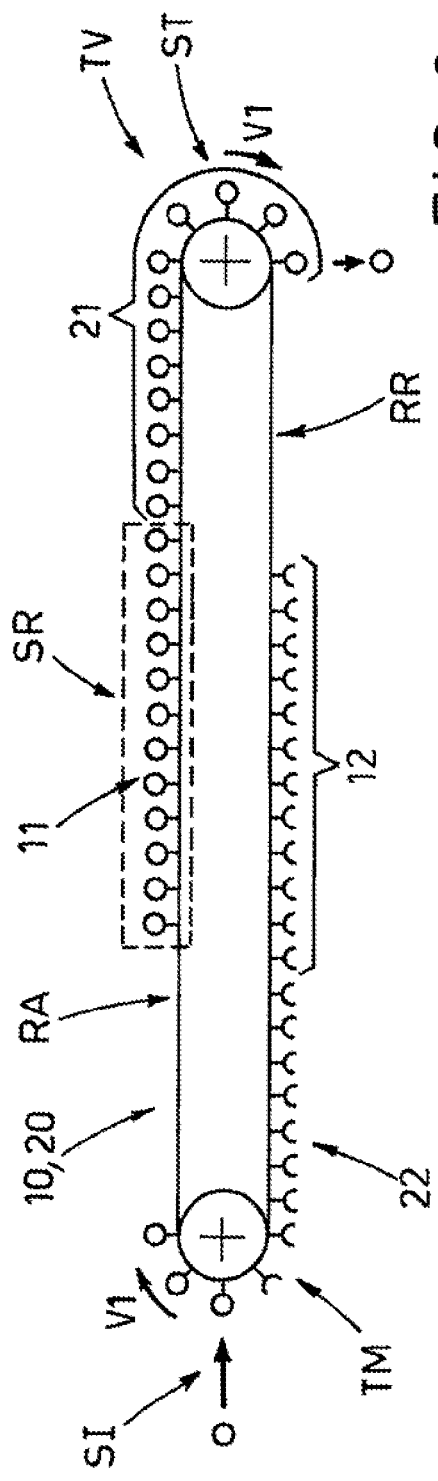

METHOD FOR CONVEYING CONTAINERS THROUGH OPERATING STATIONS AND A MULTIPLE CONVEYOR FOR ACTUATING THE METHOD

BACKGROUND OF THE INVENTION

The invention concerns the technical sector of automatic machines for packing articles.

In general, these machines can be divided into "continuous drive" machines and "step drive" machines, on the basis of the type of motion imposed on the respective transporter lines Sometimes continuous drive and step drive machines coexist in a production line; machines also exist which have transporter lines with continuous advancement and others with alternated step advancement.

Naturally, in the abovementioned cases, it becomes necessary to provide interfacing organs for reconciling the different modes of functioning and enabling transfer of the transported articles from a machine located upstream to a machine located downstream or from one line to another.

In these cases, intermediate conveyors of a particular type, known as "synchro-dynamic" transporters can be provided between the machines, or between contiguous sections of the machines, which transporters exhibit non-homogeneous drives. The particularity of these conveyors is that they provide different types of motion at inlet and outlet thereof.

"Synchro-dynamic" transporters have two advancement groups which extend along the same trajectory and are activated independently of each other; at least one series or gripping organs or crates, appropriately distanced from the other series, is associated to each advancement group; in this way a first series of organs or crates, situated upstream, can be driven continuously, while the remaining series, arranged downstream, is step driven, or vice versa.

In "synchro-dynamic" conveyors no intermediate stations between upstream and downstream are provided, therefore their function consists solely of "linking" two machines or transporter lines having different type of drive.

The present applicant has developed an automatic machine for filling and subsequently capping rigid tubular containers arranged vertically; a predetermined number of articles is inserted one at a time into each of the containers, and at the end of the filling operation, the articles are piled one on top of the other (please refer in this connection to Applicant's request no. BO2006A 000899).

This machine loads the containers into a conveyor one by one at an inlet station upstream, then transfers them first towards a filling station and, subsequently from there, through any intermediate stations present, then towards a capping station and further towards an outlet station downstream.

The abovementioned filling operation must necessarily be performed with the container at rest for a duration depending on the machine-time for a single insertion multiplied by the number of the insertions required to fill the container.

The other operations performed at the stations upstream and downstream of the filling station are obviously performed to coincide with the motion pause stage at the filling operation, even if they require shorter times than the filling operation.

In a first known technique, a traditional single-step conveyor is used to transport the containers and the pause period required between each advancement step must be calibrated on the basis of the time required for carrying out the longest of the operations, that is, the filling stage; the resulting machine is therefore extremely slow and provides unsatisfactory productivity.

A possible partial remedy for this drawback consists in providing multiple operating organs at each station, which are therefore capable of acting at the same time on two or more containers, with a conveyor activated in its turn with a multiple step which corresponds to the number of containers to be dealt with at each stage; in this way, a proportional increase of productivity is obtained with the same pause time.

This solution significantly complicates the construction of the machine's operating organs, with complications increasing proportionally to the number of containers to be treated simultaneously, and leads to a series of negative consequences, both in terms of costs and operational reliability.

Compared with the first technical solution, a nominally significant increase in productivity is obtained, since productivity doubles or trebles, yet in absolute terms this is still modest when compared with market requirements.

For the machine described above, and other machines with similar operational requirements, the need is felt for a conveyor which functions flexibly and is to some degree comparable with how a "synchrodynamic" conveyor interfaces between two transporter lines having different forms of activation.

Thus an aim of this invention is to provide a multiple conveyor for conveying containers through operating stations, which conveyor is to be associated to an automatic machine and designed in such a way as to adapt the advancement cycle of the containers to the optimal conditions for each operating station of the machine, in order to obtain both high productivity levels and the greatest-possible simplicity of construction for the operating organs situated in each of the stations.

A further aim of the invention is to provide a conveyor which, thanks to its characteristics, favors the achievement of high operational reliability of the machine to which it is associated.

A still further aim of the invention consists in providing a conveyor conformed in such a way that it allows rational machine lay-out configurations, in accordance with the ergonomics, size limitation, and location requirements of the various operating organs.

A further aim of the invention is to provide a method for conveying containers through operating stations which satisfies the technical-functional requirements of the various stations, while at the same time optimising each station's performance and positively affecting productivity relative to packing containers with relative products.

The above aims are obtained according to the contents of the appended claims.

SUMMARY OF THE INVENTION

A multiple conveyor for advancing containers, comprised in an automatic machine which has at least: an inlet station, in which the containers are loaded in the conveyor; a station for filling the containers with predetermined products; a station for closing the containers and an outlet station for discharging the containers from the conveyor, which conveyor comprises: at least a first transporter and second transport, which developed superposed one over another along a same ring-wound trajectory, to which first and second transporters gripping organs are constrained for gripping the containers from at least the inlet station SI to the outlet station, the gripping organs being grouped in a same number N in at least four batteries of the gripping organs wherein the gripping organs are equidistant, the first battery and second battery being equidistant from each other and associated to the first transporter, and the third battery and the fourth battery being equidistant from each other and associated to a second transporter, and also intercalated with the first battery and the second battery of the first transporter, thus defining empty places between two consecutive batteries of one and the other transporter, a number of which empty places being able to vary dynamically between zero and a maximum value; motor organs to independently drive the transporters in order to impose: a constant and intermittent presence of gripping organs at the inlet station, as well as of gripping organs with relative container at the closing station and outlet station; and the maintaining at pause of the battery immediately downstream of the inlet station at the filling station, thus avoiding interference between the filled containers and the empty containers gripped by a same number of gripping organs situated upstream of the filling station and activated intermittently.

BRIEF DESCRIPTION OF THE DRAWINGS

The characteristics of the invention will be made clearer by the following description of a preferred embodiment of the conveyor of the invention, highlighting the operational stages of the method provided in accordance with the claims and with the help of the appended tables of the drawings, in which:

FIG. 1 schematically shows a side view of the conveyor;

FIG. 2 shows a plan view of the conveyor shown in FIG. 1, with the latter being in a first operating phase;

FIGS. 3 to 7 show subsequent operating phases of the operating cycle of the conveyor, in the same view as FIG. 2;

FIG. 8 shows an operating stage identical to that of FIG. 2, reached at the end of the previous stages.

DESCRIPTION OF THE PREFERRED EMBODIMENTS

Figure 3:
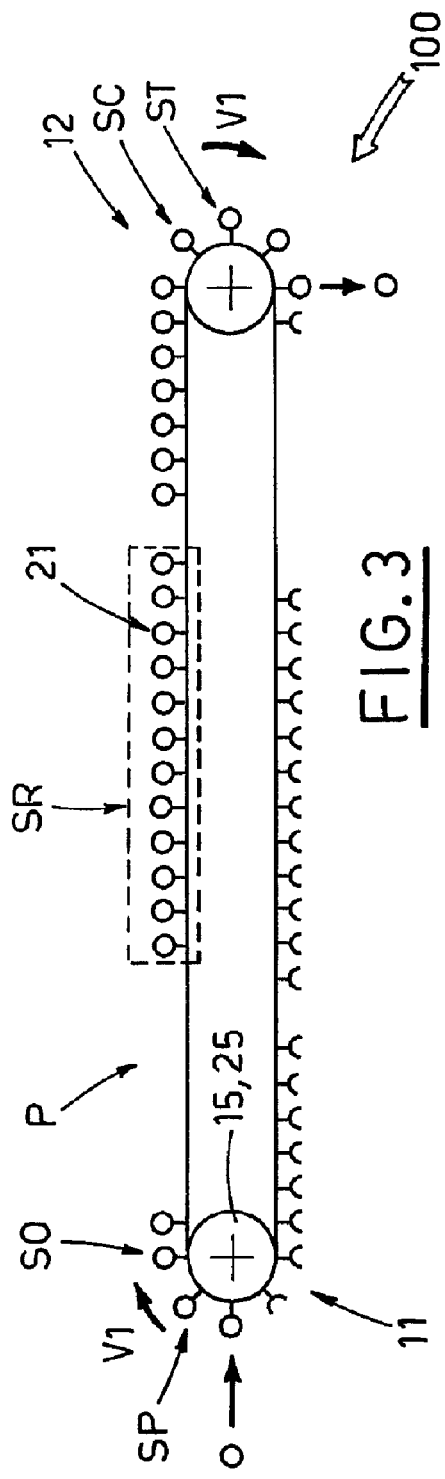

In the abovementioned figures, 100 denotes the multiple conveyor of the invention in its entirety.

The multiple conveyor 100 is designed to be associated to an automatic machine, not shown, for packing products, and for example of the type, illustrated in the preamble to the present description, which fills and subsequently caps rigid containers 1 of tubular shape, arranged vertically.

Note that some of the characteristics of the multiple conveyor 100 identified in the following description are specific to the particular application mentioned, but obviously configurations differing from the conveyor 100 are possible in order to make it suitable for other applications.

The multiple conveyor 100 is suited to receiving the containers 1 at an inlet station SI upstream, and then transferring the containers 1 downstream towards a filling station SR, then towards a capping station ST and, finally, towards an outlet station SU.

Besides the stations already listed, the machine has four supplementary stations:

a station SP for internally cleaning the containers 1, situated immediately downstream of the inlet station SI;

a station SO, situated immediately downstream of the cleaning station SP, for angularly orienting the containers 1 to enable reading of the relative recognition code;

a station SC, situated downstream of the filling station SR and immediately upstream of the capping station ST, for controlling the filling level reached in the containers 1;

a station SS, situated downstream of the outlet station SU, for rejecting defective containers, through which station SS defective containers therefore travel without being discharged from the conveyor 100 (FIGS. 6, 7).

A predetermined number of articles (not shown) is inserted into each container 1 at the filling station SR, by means of a series of individual insertions. When the insertion operation is concluded, the articles are piled one upon the other (as illustrated for example in the mentioned application BO2006A 000899).

According to the classification mentioned in the preamble, the abovementioned machine is of the "stepped" type and is so built that its operating organs situated at the inlet station SI, the capping station ST and the outlet station SU, and at the supplementary stations, act upon one container at a time, for reasons of constructive simplicity, reliability and cost; in contrast, the operating organs destined to fill the containers 1 with articles, situated at the station SR, act simultaneously upon a plurality of containers 1, in such a way that the long rest time, necessary to complete the filling operation, involves several containers 1, thus increasing productivity.

The object of this invention, the multiple conveyor 100, is suited to fulfilling such requirements, as will be better specified below, and to this aim it comprises two transporters 10, 20, activated by relative independent drive organs and extending along a same ring-wound trajectory P, along which ring-wound trajectory P four batteries 11, 12, 21, 22 are arranged, respectively first, second, third and fourth, each formed by the same predetermined number of gripping organs 3, each of which is suited to receiving and bearing one of the containers 1 at least from the inlet station SI to the outlet station SU.

The first battery 11 and the second battery 12 are constrained to one transporter 10 forming a first pair, while the third battery 21 and the fourth battery 22 are constrained to the remaining transporter 20, forming a second pair; the serial extension of these batteries makes it possible to intercalate the batteries of one pair with those of the other pair.

The batteries belonging to a pair of batteries are located at a fixed distance from each other, while the distances of this couple from the batteries belonging to the other pair can vary dynamically from a minimum to a maximum, as described below.

Each of the transporters 10, 20 consists of a flexible transmission organ, 13, 23 (for example a cogged belt), extended between two pulleys, respectively drive pulley 14, 24 and driven pulley 15, 25, the drive pulley 14, 24 being connected to a relative electronically controlled motor, not shown, for example of the brushless type.

The two drive pulleys 14, 24 and the two driven pulleys 15, 25 are arranged respectively coaxially, with vertical axes, therefore the two cogged belts 13, 23 are superposed one over the other and the shared ring-wound trajectory P is defined by a straight outgoing advancement branch RA and a rectilinear return advancement branch RR, connected, at the pulleys, by an upstream curved section TM and a downstream curved section TV.

In the example in the appended figures, the inlet station SI is positioned in the upstream curved section TM, the filling station SR along the outgoing advancement branch RA, the capping station ST in the downstream curved section TV and the outlet station SU at the end of the downstream curved section, before the beginning of the return advancement branch RR.

As already mentioned, the operating organs situated at the filling station SR act simultaneously on a plurality of containers 1, twelve in the example; each battery 11, 12, 21, 22 therefore comprises twelve gripping organs 3.

The trajectory P must extend sufficiently to contain forty-eight places for the forty-eight gripping organs 3 of the batteries 11, 12, 21, 22, plus twelve empty places, corresponding to those of one of the batteries, variably distributed among the batteries according to the relative positioning thereof during operation; in the appended figures of the drawings, an additional four further places must be added to these twelve empty places: this technical-functional aspect will be analyzed below.

The total number of empty places, sixteen in the particular illustrated application of the conveyor 100, is essential to ensure that at least the inlet station SI, the capping station ST and the outlet station SU are fed with continuity, that is, without any of the empty places ever being at the stations.

The multiple conveyor 100 further comprises control and command organs, for example PLCs or the like, not illustrated in detail, for piloting the transporters 10, 20 according to a single-step motion, i.e. intermittent advancement, required at the inlet station SI, the capping station ST and the outlet station SU, and in the supplementary stations, and according to a multiple step advancement motion required to feed the filling station SR.

There follows a description of the functioning of the multiple conveyor 100 in the configuration described above, starting from the situation illustrated in FIGS. 1 and 2 in which:

the first battery 11 of the first drive group 10 occupies all the upstream curved section TM and the end part of the return branch RR;

symmetrically, the second battery 12 of the first drive group 10 occupies all the downstream curved section TV and the end part of the outgoing branch RA;

the third battery 21 of the second drive group 20 is at pause along the outgoing advancement branch RA, at the filling station SR highlighted with a dotted line box (FIG. 2), queuing behind the second battery 12 of the first group 10, with no empty places between the two;

the fourth battery 22 of the second group 20, highlighted with a brace bracket (FIG. 2), is also at pause, along the return advancement branch RR, queued behind the battery 11 of the first group 10, with no empty places between the two.

The first group 10 is activated intermittently, with one step advancement (arrows V1 in FIG. 2), in such a way that the relative batteries 11, 12 advance by one place at a time, with a predetermined time interval (or intermittence period), in such a way as to allow the functioning of the operating organs present at the inlet station SI, the cleaning station SP, the orientation station SO, the control station SC, the capping station ST, and the outlet station SU; in this situation the reject station SS is not occupied.

At the same time, the second group 20 undergoes a prolonged rest, to permit the sequence of insertion of articles necessary to fill the containers 1 borne by the gripping organs 3 of the battery 21.

FIG. 3 illustrates advancement by one step, compared with FIG. 2, of the first and second batteries 11, 12 of the first drive group 10, with the third and fourth batteries 21, 22 of the second group 20 still at pause; consequently this defines an empty place between the end of the first battery 11 and the beginning of the fourth battery 22, and another between the end of the second battery 12 and the beginning of the third battery 21.

Figure 4:
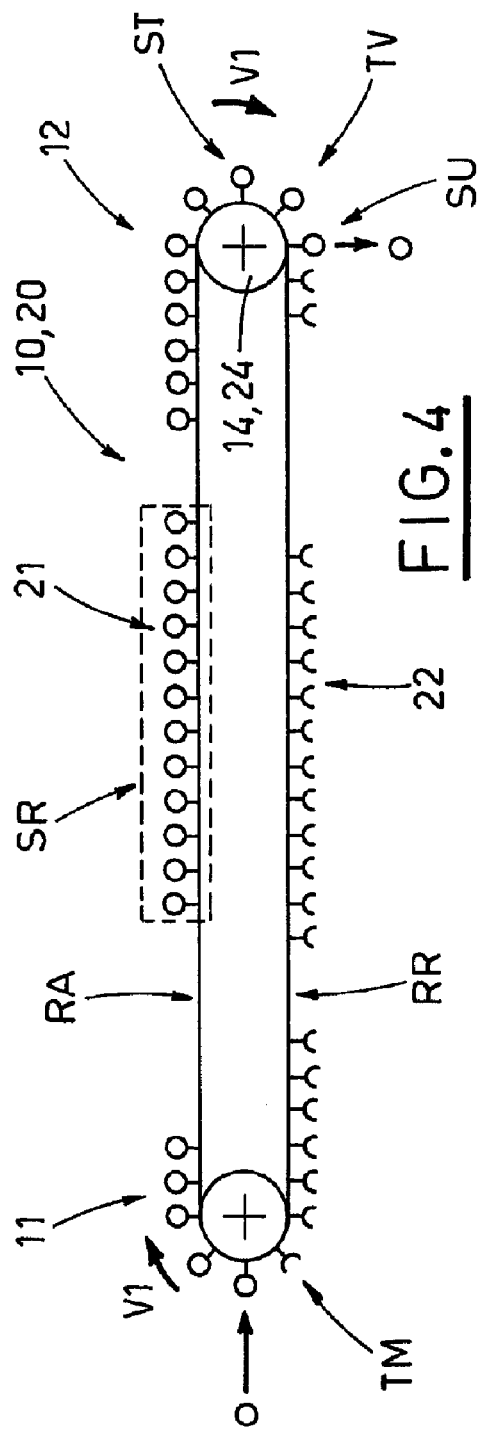

FIG. 4 illustrates advancement by a further step, compared to FIG. 3, of the first and second batteries 11, 12, with the remaining third and fourth batteries 21, 22 still at pause; thus the empty places between the first and fourth batteries 11, 22 and second and third batteries 12, 21 are now two.

One step advancement of the batteries 11, 12 of the first drive group 10 continues until the batteries 11, 12 are queued respectively behind the third and fourth batteries 21 and 22 of the second group 20, which is still at rest (FIG. 5).

The above-described situation takes place in phase relation with conclusion of the filling of the containers 1 in the station SR.

Note that the time available to perform the filling operation depends on the intermittence period and on the distance between the last gripping organ of the third battery 21 and the first gripping organ of the first battery 11, all referred to the configuration of FIG. 2.

In a phase relation with the end of the filling operation, the second drive group 20 is activated in order to make part of the third battery 21 come out of the filling station SR, initially with a rapid multiple step translation (arrow V2 in FIG. 6) such that the empty places present before the third battery 21 are absorbed, so that the third battery 21 is queued behind the second battery 12 of the first group 10 preceding it (FIG. 6).

At the same time, the fourth battery 22 of the second group 20 is advanced such as to be queued behind the first battery 11 of the first group 10 which precedes it (see FIG. 6).

At this point the second group 20 has to change the advancement of the relative third and fourth batteries 21, 22 to one step advancement (arrow V1 in FIG. 7), synchronized with that of the first group 10, so that the exit from the filling station SR of the last gripping organs 3 of the third battery 21, with the relative filled containers 1, takes place with one step motion, as does the entry of the first gripping organs 3, with the corresponding empty containers 1, of the following first battery 11 to the station SR (FIGS. 6 and 7).

The exit from the filling station SR of the last filled container 1 of the battery 21, coincides with the discharge, by preceding second battery 12, of the last capped container 1 at the outlet station SU (see FIG. 7).

At the end of the stage just described, the second battery 12 is disengaged from the organs of the outlet station SU and, at the same time, the third battery 21 has completely freed up the filling station SR.

The simultaneous double aspect of this condition makes it possible to switch activation of the first transporter 10, till now operating in the single-step mode, to multiple-step operation, thus determining a rapid translation such as to complete the entry of the relative first battery 11 into the filling station SR, where it queues behind the third battery 21 of the second transporter 20 preceding it and, consequently, an equal advancement of the second battery 12, which queues behind the fourth battery 22 (FIG. 8).

Immediately afterwards, the first transporter 10 is stopped and pauses, while the second transporter 20 continues its one step advancement, thus defining a situation similar to that of the beginning, as in FIG. 2, from which a new identical cycle of operations starts again.

The functioning described above is not modified by the presence or absence of defective containers 1 to be rejected at the reject station SS subsequent to the outlet station SU; defective containers, as already mentioned, travel through the outlet stations without being discharged from the conveyor 100 and reach the rejection station SS from where they are extracted from the relative gripping organ 3 using an appropriately shaped striker (not shown).

This striker operates equally with either one-step or multiple-step advancement of the conveyor.

As already illustrated, the batteries consist of the same number N of gripping organs: in the case illustrated as an example, N is twelve.

To optimize the apparatus associated to the inlet station SI, the capping station ST and the outlet station SU, these stations must be supplied continuously.

In the configuration in FIG. 2 a gripping organ with relative container 1 reaches the inlet station SI, the same applying for the cleaning station SP and the orientation station SO downstream of the inlet station SI.

For the reasons explained above, gripping organs 3 with relative containers (previously filled) reach the capping station ST and the outlet station SU: in the example illustrated, an inoperative station Z is arranged between these two stations ST, SU, in which inoperative station Z there are no operating organs acting on the capped containers.

In the configuration in FIG. 2 there is a number of empty places between the orientation station SO and the filling station SR.

The optimal number for these places can be deduced with reference to the configuration in FIG. 5; in this figure the first battery 11 is queued behind the third battery 21 at rest at the station SR and the last gripping organ of the first battery 11 is upstream of the inlet station SI: consequently the number of empty places between the first battery 11 and the third battery 21 as in FIG. 2, is equal to (N-N*) with N* equal to four, that is, the places relative to the gripping organs reaching the inlet station SI, the cleaning station SP, the orientation station SO and the gripping organ upstream of the station SI.

Substantially in the illustrated example the maximum number of empty places (FIG. 2) between the station SO and the station SR is eight, and there are obviously also eight empty places between the station SU and the fourth battery 22 (see FIG. 2): in total there are therefore sixteen empty places.

In FIG. 5 the first battery 11 is queued behind the third battery 21; correspondingly the second battery 12 is queued behind the fourth battery 22.

In the embodiment illustrated, the time required to complete one step of the first battery 11 and of the second battery 12, is equal to the time required by the third battery 21 and the fourth battery 22 to come to queue respectively behind the second battery 12 and the first battery 11 (see FIG. 6).

Thus in the example illustrated, the time for filling the containers at rest in the station SR (third battery 21) is equal to the time required to effect eight steps, that is, the time necessary to "fill" the empty places upstream of the station SR.

This time can be increased by an amount corresponding to one "step", by increasing by one the number of empty places; with reference to the starting configuration of FIG. 2, this would mean that there is no gripping organ upstream of the station SI. In this situation, when the third battery 21 and the fourth battery 22 are advanced, the first gripping organ of each of the batteries would move respectively in the capping station ST and the inlet station SI.

Note that a reduction in the number of empty places entails both a diminution of the axial extension of the conveyor, and a diminution of the rest time for the battery situated at the filling station.

Given the same number of gripping organs in each battery, and given the some intermittence period for the supply groups 10, 20, there is an upper limit for the pause time in the station SR, which upper limit derives from observance of the already-mentioned technical-functional aspect, that is, maintenance of uninterrupted intermittent feed in the inlet station SI, capping station ST and outlet station SU.

The possible absence of the cleaning station SP and orientation station SO would not entail an increase in the maximum number of empty stations between the station SR and the first gripping organ of the following battery (the battery downstream), since similar considerations apply for the capping station ST and the outlet station SU.

The above description clarifies the special characteristics of the multiple conveyor provided, which thanks to its operational versatility is capable of adapting to the different, and to some extent contrasting, requirements of advancement of the containers in the various operating stations, making high machine productivity possible while maintaining maximum simplicity of construction of the operating organs situated at each of the stations.

The intrinsic constructive simplicity of the conveyor, together with the simplicity made possible for the operating organs, ensures an overall high degree of functional reliability for the machine to which it is associated.

The conveyor of the invention allows the lay-out of the machine to be configured in a highly flexible way, beyond what is shown in the appended figures, thus adapting to the specific ergonomics, size limitation, and location requirements of the various operating organs.

While it provides significant advantages, the costs of the conveyor of the invention are similar to those for known conveyors, thus they constitute no addition to the overall cost of the machine for which it is destined.

The above description is a non-limiting example and any modification to details that may be usefully adopted for technical-functional reasons are to be considered part of the ambit of protection defined in the claims below.

What is claimed is:

1. A method for conveying containers through operating stations involving use of a multiple conveyor comprising at least a first transporter and a second transporter, activated independently of each other, extending along a same ring-wound trajectory, one of the first and second transporters being superposed on the other thereof, to which first and second transporters gripping organs are constrained for gripping individual containers at an inlet station and for transferring the containers through stations for filling the containers, for closing the containers and for outlet of the closed containers from the conveyor, the gripping organs being grouped in equal numbers and in at least four batteries in which the gripping organs are spaced from each other, the first battery and the second battery thereof being reciprocally equidistant and associated to the first transporter, and the third battery and fourth battery thereof being reciprocally equidistant and associated to the second transporter, and dynamically intercalated with the first battery and second battery of the first transporter; the method being characterized in that it includes the steps of:

halting one of the first or second transporters with a relative battery of the halted transporter pausing in the filling station, and contemporaneously step-activating and step moving the remaining of the first or second transporters in order to ensure a continuous step moving presence of gripping organs of a battery of the step moving transporter at the inlet station, and of gripping organs with product-filled containers of the remaining battery of the remaining first or second transporter being present at the closing station and outlet station;

maintaining the preceding stage for both transporters until the step-activated and step moving batteries are positioned in a queue behind the preceding paused batteries;

step-activating both the first and the second transporters to ensure a step moving presence of gripping organs at the inlet station and of gripping organs holding relative containers at the closing station and outlet station up to either disengagement of a last gripping organ of the battery occupying the inlet station therefrom, or disengagement from the outlet station of a last gripping organ holding a container of the battery occupying the closing station and outlet station;

moving the transporter bearing the leading batteries by a multiple step until the most advanced battery is positioned and halted in the filling station, and step-moving the remaining transporter such as to ensure the step moving presence of the gripping organs of a battery of the remaining transporter in the inlet station, and to ensure the step moving presence of the gripping organs bearing relative filled containers of the remaining battery of the remaining transporter at the closing station and at the outlet station;

repetition of the above steps stages.

2. The method of claim 1, further comprising a cleaning station and an orientation station arranged in order immediately downstream of the inlet station, and wherein a temporary positioning of two consecutive batteries of one transporter and of the other transporter ensures a step moving presence of gripping organs at the inlet station, the cleaning station and the orientation station.

3. The method of claim 1, further comprising a control station located immediately upstream of the closing station, and wherein a temporary positioning of two consecutive batteries of one transporter or of the other transporter ensures a step moving presence of gripping organs with relative product-filled containers in the control station, the closing station and the outlet station.

* * * * *